United States Patent [19]

Ammons

[11] 4,241,140
[45] Dec. 23, 1980

[54] LAMINATED SAFETY GLASS WITH POLYURETHANE FILM

[75] Inventor: Vernon G. Ammons, Glenshaw, Pa.

[73] Assignee: PPG Industries, Inc., Pittsburgh, Pa.

[21] Appl. No.: 895,693

[22] Filed: Apr. 12, 1978

[51] Int. Cl.³ .................. B30B 17/10; B32B 27/40; C03C 27/00

[52] U.S. Cl. .................. 428/339; 156/106; 156/246; 156/331; 428/426; 428/425.6; 528/78

[58] Field of Search .......... 156/99, 102, 242, 106, 156/246, 331; 428/426, 424, 425, 225; 528/76, 81, 78; 264/298, 301, 261

[56] References Cited

U.S. PATENT DOCUMENTS

| | | | |
|---|---|---|---|
| 3,169,945 | 2/1965 | Hostettler et al. | 528/354 |
| 3,509,015 | 4/1970 | Wismer et al. | 156/99 |
| 3,620,905 | 11/1971 | Ahramjian | 428/424 |
| 3,764,457 | 10/1973 | Chang et al. | 428/425 |
| 3,775,354 | 11/1973 | Hostettler et al. | 528/81 |
| 3,808,077 | 4/1974 | Rieser et al. | 156/102 |
| 3,878,036 | 4/1975 | Chang | 428/424 |
| 3,881,043 | 4/1975 | Rieser et al. | 156/99 |
| 3,900,446 | 8/1975 | McClung et al. | 528/81 |
| 3,900,655 | 8/1975 | Wolgemuth et al. | 428/424 |
| 3,931,113 | 1/1976 | Seeger et al. | 428/425 |
| 3,989,676 | 11/1976 | Gerkin et al. | 528/81 |
| 4,024,113 | 5/1977 | Ammons | 428/425 |
| 4,035,548 | 7/1977 | Chang et al. | 428/425 |

*Primary Examiner*—Michael W. Ball
*Attorney, Agent, or Firm*—Donna L. Seidel

[57] ABSTRACT

A transparent, elastomeric polyurethane useful as an interlayer in safety glass laminates is prepared by the reaction of an aromatic diisocyanate with a mixture of a polyalkylene ether glycol, a polycaprolactone triol, and a monomeric aliphatic diol.

7 Claims, No Drawings

LAMINATED SAFETY GLASS WITH POLYURETHANE FILM

BACKGROUND OF THE INVENTION

The present invention relates generally to transparent, energy-absorbing polyurethanes and more particularly to such polyurethanes for use in safety glass laminates with high impact resistance over a wide temperature range.

Safety glass is a well-known term for a glass-plastic laminate designed to reduce the severity of lacerative injuries resulting from glass breakage upon impact. A polymeric film is laminated to a glass sheet so that upon impact sufficient to break the glass, the film adheres to the glass fragments, minimizing their dispersion. To be useful as safety glass, a laminate must have (1) high energy absorption to minimize concussive injuries on impact, (2) high shear and tear strength to prevent rupture of the film by glass fragments, (3) sufficient adhesion between the layers to minimize the dispersion of glass fragments to reduce the potential for lacerative injuries and (4) high optical quality.

Commercial safety glass, particularly for automobile windshields, is typically a trilayer laminate comprising two sheets of glass with an intermediate layer of plasticized polyvinyl butyral. However, there is a trend toward substituting other polymeric interlayer materials for polyvinyl butyral.

In U.S. Pat. No. 3,509,015, Wismer et al, describe a safety glass laminate with a cast-and-cured-in-place polyurethane interlayer prepared by the reaction of an organic diisocyanate and a curing agent with a prepolymer which is formed by the reaction of an organic diisocyanate and a poly(oxypolymethylene)glycol. Suitable curing agents include polyols, especially those with at least three hydroxyl groups, and preferably in conjunction with a diol, and polyamines, preferably utilized with a polyol. The reaction mixture is heated, degassed, placed in a casting cell, cured and the resulting laminate is tested. Impact resistance of the laminate, measured as the height from which a ½ pound steel ball may be dropped with the laminate withstanding the impact, is acceptable.

In U.S. Pat. No. 3,620,905, Ahramjian discloses colorless, optically clear, thermoplastic polyurethanes suitable for use in safety laminates prepared from diisocyanate-dicyclohexylmethane, a polyether or polyester glycol, and a diol having a molecular weight less than 250. The polyurethanes may be prepared by one-shot, quasi-prepolymer, or conventional prepolymer procedures, all of which are well-known in the art.

U.S. Pat. No. 3,764,457 to Chang et al discloses safety glass laminates comprising a thermoplastic polycarbonate urethane formed from a cycloaliphatic diisocyanate, a monomeric aliphatic diol, and an aliphatic polycarbonate such as polyoxyethylenecarbonate glycol.

In U.S. Pat. No. 3,900,446, McClung et al disclose laminated glazing units containing polyurethane interlayers prepared from an isomeric mixture of 4,4'-methylene-bis-(cyclohexylisocyanate), a polyester having a melting point above 42° C. which is the condensation product of a dicarboxylic acid and a dihydric compound, and an alpha-omega diol having from 2 to 10 carbon atoms. The two-step method for making the polyurethanes involves prepolymer preparation and polymer preparation.

U.S. Pat. No. 3,900,655 to Wolgemuth et al describes laminated safety glass made with a thermoplastic interlayer which is the polyurethane reaction product of a cyclic nitrile carbonate and at least one hydroxyl-containing compound such as a polyalkylene ether or polyester glycol or a diol having primary or secondary hydroxyl groups and a molecular weight less than 250. Such polyurethane elastomers can be prepared by a variety of methods well-known in the art such as one-shot, quasi-prepolymer or full prepolymer procedures.

In U.S. Pat. No. 3,931,113, Seeger et al disclose polyester urethanes having superior properties for use in safety glass windshields which are formed from a cycloaliphatic diisocyanate, a low molecular weight diol, and a hydroxy terminated polyester of polycaprolactone, poly(butylene adipate), poly(butylene azelate) or mixtures thereof. These urethanes are preferably prepared by the one-step bulk polymerization method which provides a flexible polymer having a random distribution of components.

In U.S. Pat. No. 4,024,113, Ammons discloses energy-absorbing safety glass laminates comprising a polycarbonate urethane formed from a cycloaliphatic diisocyanate, a low molecular weight diol, and a special polycarbonate diol synthesized from a mixture of linear aliphatic and cycloaliphatic diols. The polycarbonate urethanes can be prepared either by the "one-shot" bulk polymerization method or by the prepolymer method.

U.S. Pat. No. 4,035,548 to Chang et al discloses safety glass laminates containing energy-absorbing interlayers made from a poly(lactoneurethane) in which the molecular weight and structure of the lactone moiety are carefully controlled in order to obtain optimum energy-absorbing and optical properties. The "one-shot" method of polymerization is preferred to the prepolymer method because of its simplicity and the lower initial viscosity of the reactants.

Many of the reference relating to transparent, energy-absorbing polyurethanes for interlayers in safety glass laminates teach that cycloaliphatic diisocyanates are preferred, particularly 4,4'-methylene-bis-(cyclohexylisocyanate), because of their contribution to colorlessness, transparency and impact resistance. Unfortunately, these diisocyanates are rather expensive. Mixtures with minor amounts of less expensive diisocyanates, such as toluene diisocyanates (TDI) or diphenyl methane diisocyanate (MDI) and other aromatic diisocyanates, are usable only if the amount of aromatic diisocyanate employed is carefully controlled to avoid yellowing, translucence and reduced impact resistance.

SUMMARY OF THE INVENTION

The present invention involves an interlayer for a safety glass laminate made from a polyurethane which is the reaction product of toluene diisocyanate with a mixture of a polyalkylene ether glycol, a polycaprolactone triol, and a monomeric aliphatic diol.

The polyurethane composition of the present invention offers raw material cost advantages, simple processing, and better impact resistance than typical commercially available high-impact vinyl interlayers.

The polyurethane interlayer of the present invention is prepared by the one-step bulk polymerization of a reaction mixture of toluene diisocyanate, a polyalkylene ether glycol and a polycaprolactone triol, and offset casting; i.e., forming the interlayer sheet by casting the polymerization reaction mixture into a cell, forming a sheet of polymer, and removing the sheet from the cell for subsequent lamination to a glass sheet. The offset casting technique is possible because the polyurethane composition of the present invention is readily handleable in sheet form substantially before a full cure has been achieved. The partially cured sheets may be laminated shortly after removal from the casting cells or may be stored for future lamination.

DETAILED DESCRIPTION OF THE PREFERRED EMBODIMENTS

A colorless liquid reaction mixture is prepared comprising an aromatic diisocyanate, a polyalkylene ether glycol, a polyester triol and a monomeric aliphatic diol. The polyalkylene ether glycol is of the general formula:

$$H\text{--}[O(CH_2)_n]_m\text{--}OH$$

wherein n is preferably from about 3 to about 6 and m preferably is such that the molecular weight of the polyalkylene ether glycol is from about 400 to about 2000. Polytetramethylene ether glycol having a molecular weight of about 1000 is preferred.

The polyester triol is included to provide branching sites in the polyurethane structure. Preferred polyester triols include polycaprolactone triols. The molecular weight and proportion of triol in the reaction mixtures is determined in accordance with the desired molecular weight between branch points in the polyurethane to give optimum properties. A particularly preferred polyester triol is a polycaprolactone triol having a molecular weight of about 300. Other trifunctional compounds such as trimethylolpropane may be used to provide for branching in the polyurethane.

Aliphatic monomeric diols useful as chain extenders for the polyurethane according to the present invention preferably have the general formula:

$$HO\text{--}(CH_2)_n\text{--}OH$$

wherein n is from about 2 to about 10. Other aliphatic diols including cycloaliphatic, substituted, and secondary alcohols may also be used but are less preferred, as are difunctional chain extenders other than diols such as diamines. A preferred chain extender is 1,4-butanediol.

Aromatic diisocyanates useful in preparing polyurethanes are well-known in the art. A preferred aromatic diisocyanate for preparing polyurethanes according to the present invention is toluene diisocyanate. A commercially available mixture of 65 percent 2,4-toluene diisocyanate and 35 percent 2,6-toluene diisocyanate is preferred over the 80/20 isomer mixture since the higher proportion of 2,6-toluene diisocyanate appears to improve the performance of the polyurethane at low temperatures. The proportion of diisocyanate in the reaction mixture is preferably approximately equivalent to the total of polyalkylene ether glycol, triol branching agent and diol chain extender. However, a stoichiometric imbalance up to about 5 percent excess isocyanato groups does not seriously degrade the quality of the polyurethane.

The above materials are blended together to form a colorless, transparent, single-phase, low viscosity liquid reaction mixture at room temperature. Preferably, the polyalkylene ether glycol, polycaprolactone triol and monomeric aliphatic diol are heated gently in a vacuum and then placed in a reaction kettle under dry nitrogen. The toluene diisocyanate is added to the above mixture while stirring. The final mixture, preferably containing adhesion control agents as shown in U.S. Pat. No. 3,900,686, is degassed and cast into sheet molds wherein the reaction mixture polymerizes to form polyurethane interlayer sheets. Preferably the reaction proceeds to a degree of polymerization of at least about 50 before the polyurethane interlayer sheets are removed from the casting cells.

The polyurethane interlayers, which preferably have a number average degree of polymerization between about 50 and about 125, are subsequently laminated to glass sheets, preferably in accordance with U.S. Pat. No. 3,808,077. The polyurethane achieves a full cure during a typical autoclave lamination cycle, such as a temperature of about 300° F. (about 149° C.) and a pressure of about 200 pounds per square inch for about 45 minutes. Alternatively, the polyurethane may be substantially cured prior to lamination since it has been found, unexpectedly since the polyurethane is crosslinked, that a fully cured interlayer can be laminated to glass to yield a laminate of acceptable optical quality.

EXAMPLE I

A polytetramethylene ether glycol having a molecular weight of about 1000, which is a semi-solid at room temperature, is heated. The polytetramethylene ether glycol, available as Polymeg 1000 from the Quaker Oats Company, becomes completely liquid at about 100° F. (about 38° C.) and remains liquid for a long time at room temperature, and indefinitely in a mixture with a liquid polycaprolactone triol and butane diol. A mixture containing 131.00 grams of polytetramethylene ether glycol, 28.71 grams of 1,4-butane diol and 10.00 grams of a 300 molecular weight polycaprolactone triol is placed in a reaction kettle under vacuum with overhead stirring. With the kettle contents at about 86° F. (about 30° C.) the vacuum is broken with dry nitrogen and 87.00 grams of toluene diisocyanate added. The toluene diisocyanate is the preferred isomer mixture containing 65 percent 2,4-toluene diisocyanate and 35 percent 2,6-toluene diisocyanate, available as Hylene TM 65 from duPont. The reaction kettle is again evacuated to degas the reaction mixture. As quickly as possible after the vacuum is broken with dry nitrogen, the reaction mixture is cast into 14 by 14 inch (about 35.6 centimeter square) cells made from TEFLON fluorocarbon coated glass sheets spaced at 30 mils (about 0.76 millimeter). After 2 hours in the cells at a temperature of 270° F. (about 132° C.), the polyurethane sheets are cured to an easily handleable stage and can be removed from the cells for subsequent lamination. The polymer has a urethane content of 23 percent and a molecular weight between branch points of about 4700.

EXAMPLE II

A polyurethane reaction mixture is prepared as in Example I with the same materials in the following proportions:

| Ingredient | Molecular Weight | Equivalents |
| --- | --- | --- |
| polytetramethylene ether glycol | 1000 | 0.451 |
| polycaprolactone triol | 300 | 0.100 |
| 1,4-butane diol | 45 | 0.449 |
| toluene diisocyanate | 174 | 1.000 |

The reaction mixture is cast and cured as in Example I to form a polymer having a urethane content of 17 percent and a molecular weight between branch points of about 6900.

EXAMPLE III

A reaction mixture is prepared as in the previous examples with the same materials in the following proportions:

| Ingredient | Weight Percent | Equivalents |
| --- | --- | --- |
| polytetramethylene ether glycol | 58.66 | 0.346 |
| polycaprolactone triol | 3.39 | 0.100 |
| 1,4-butane diol | 8.45 | 0.554 |
| toluene diisocyanate | 29.50 | 1.000 |

The reaction mixture is cast and cured as in the previous examples to form a polymer having a urethane content of 20 percent and a molecular weight between branch points of about 5900.

EXAMPLE IV

A reaction mixture is prepared as in the previous examples from the same materials in the following proportions:

| Ingredient | Molecular Weight | Equivalents |
| --- | --- | --- |
| polytetramethylene ether glycol | 1000 | 0.266 |
| polycaprolactone triol | 300 | 0.100 |
| 1,4-butane diol | 45 | 0.634 |
| toluene diisocyanate | 174 | 1.000 |

The reaction mixture further contains 0.03 percent stearyl acid phosphate and 0.20 percent Z-6040 silane, a material available from Dow Chemical, based on the total weight of the above four ingredients, for adhesion control. The reaction mixture is cast and cured as in the previous examples to form a polymer having a urethane content of 23 percent and a molecular weight between branch points of about 4700. The cast polyurethane sheet is then laminated between 12 by 12 inch (30.5 centimeters square) ⅛ inch (3.2 millimeters) thick glass sheets at a temperature of about 300° F. (about 149° C.) under a pressure of about 200 pounds per square inch for about 45 minutes. The resultant laminates are tested for impact resistance, using a 5 pound freely falling steel ball. The impact resistance in terms of mean penetration velocities, measured in miles per hour, calculated from the height from which the ball is dropped, is compared in Table 1 with the impact resistance for equivalent laminates made with high impact polyvinyl butyral interlayers.

EXAMPLE V

A polyurethane interlayer is prepared as in the previous examples from the following reaction mixture:

| Ingredient | Equivalents | Weight Percent |
| --- | --- | --- |
| Polymeg 1000 | 0.278 | 53.33 |
| 1,4-butane diol | 0.617 | 10.85 |
| trimethylolpropane | 0.105 | 1.83 |
| toluene diisocyanate | 1.000 | 33.99 |

The polymer has a urethane content of 23 percent and a molecular weight between branch points of about 4850.

The interlayer is laminated and tested as in Example IV. The impact resistance is shown in Table 1.

TABLE 1

| Mean Penetration Velocities (mph) for Safety Glass Laminates | | | |
| --- | --- | --- | --- |
| | Temperature | | |
| Interlayer | 0° F. | 70° F. | 120° F. |
| Polyurethane (Example IV) | 27 | 26 | 15 |
| Polyurethane (Example V) | 23 | 27.6 | 17 |
| Polyvinyl butryal (high impact vinal) | 17 | 24 | 12 |

The above examples are offered only to illustrate the present invention. While the polyurethanes described above generally have a stoichiometric OH/NCO ratio, a urethane content between about 15 and 25 percent and a molecular weight between branch points within the range of 4000 to 8000, other polyurethanes having the requisite properties are included within the scope of the present invention which is defined by the following claims.

I claim:
1. A method for making a laminated glass article comprising the steps of:
   a. casting into a sheet mold a single curable polyurethane reaction mixture which comprises:
      (1) a polytetramethylene ether glycol having a molecular weight from about 400 to about 2000,
      (2) a polycaprolactone triol having a molecular weight from about 300 to 1000;
      (3) a monomeric aliphatic diol having from 4 to 6 carbon atoms; and
      (4) an isomeric mixture of 2,4-toluene diisocyanate and 2,6-toluene diisocyanate;
   b. polymerizing the reaction mixture to form a self-supporting polyurethane sheet;
   c. removing the self-supporting polyurethane sheet from said mold;
   d. laminating said polyurethane sheet to a sheet of glass; and
   e. curing the polyurethane.
2. The method according to claim 1, wherein the reaction mixture comprises:
   a. a polytetramethylene ether glycol having a molecular weight of about 1000;
   b. a polycaprolactone triol having a molecular weight of about 300;
   c. 1,4-butane diol; and
   d. an isomeric mixture of 2,4-toluene diisocyanate and at least about 35 percent 2,6-toluene diisocyanate.
3. The method according to claim 1, wherein the step of laminating the self-supporting polyurethane sheet to a sheet of glass is performed prior to curing the polyurethane.
4. The method according to claim 1 wherein the step of laminating the self-supporting sheet to a sheet of glass is performed subsequent to curing the polyurethane.
5. The method according to claim 3 or claim 4 wherein the polyurethane sheet is laminated between glass sheets at a temperature of about 300° F. (about 149° C.) and a pressure of about 200 pounds per square inch.
6. The method according to claim 5, wherein the thickness of the polyurethane sheet is from 20 to 60 mils (about 0.5 to 1.5 millimeters).
7. An article prepared according to the method of claim 6.

* * * * *